United States Patent
Sanders et al.

(10) Patent No.: US 7,430,738 B1
(45) Date of Patent: Sep. 30, 2008

(54) METHODS AND ARRANGEMENTS FOR ROUTING SERVER REQUESTS TO WORKER PROCESSES BASED ON URL

(75) Inventors: Henry L. Sanders, Kirkland, WA (US); Eric D. Deily, Sammamish, WA (US); Charles K. Moore, Woodinville, WA (US); Seth B. Pollack, Seattle, WA (US); David R. Treadwell, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 630 days.

(21) Appl. No.: 09/878,950

(22) Filed: Jun. 11, 2001

(51) Int. Cl.
*G06F 9/46* (2006.01)
*G06F 15/16* (2006.01)

(52) U.S. Cl. .................. 718/100; 709/203; 709/217

(58) Field of Classification Search .............. 709/231, 709/217–219, 201–203; 719/328; 707/104.1; 718/100
See application file for complete search history.

(56) References Cited

U.S. PATENT DOCUMENTS

| | | | |
|---|---|---|---|
| 5,146,593 A * | 9/1992 | Brandle et al. .............. 719/328 |
| 5,155,837 A | 10/1992 | Liu et al. |
| 5,535,322 A | 7/1996 | Hecht |
| 5,590,266 A | 12/1996 | Carson et al. |
| 5,706,507 A * | 1/1998 | Schloss ................ 707/104.1 |
| 5,715,386 A | 2/1998 | Fulton, III et al. |
| 5,845,280 A | 12/1998 | Treadwell, III et al. |
| 5,878,408 A | 3/1999 | Van Huben et al. |
| 5,918,226 A | 6/1999 | Tarumi et al. |
| 5,920,867 A | 7/1999 | Van Huben et al. |
| 5,920,873 A | 7/1999 | Van Huben et al. |
| 5,928,323 A * | 7/1999 | Gosling et al. .............. 709/203 |
| 5,930,830 A | 7/1999 | Mendelson et al. |
| 6,023,702 A | 2/2000 | Leisten et al. |
| 6,067,580 A | 5/2000 | Aman et al. |
| 6,094,654 A | 7/2000 | Van Huben et al. |
| 6,098,064 A | 8/2000 | Pirolli et al. |
| 6,112,196 A | 8/2000 | Zimowski et al. |
| 6,157,959 A * | 12/2000 | Bonham et al. .............. 719/313 |

(Continued)

OTHER PUBLICATIONS

"Caucho Servlet Engine on Apache Unix" May 16, 2001.*

(Continued)

*Primary Examiner*—Meng-Ai An
*Assistant Examiner*—Qing-Yuan Wu
(74) *Attorney, Agent, or Firm*—Lee & Hayes, PLLC (57) ABSTRACT

Improved methods and arrangements are provided in which a web server or like process includes a kernel-mode universal listener (UL) capability that utilizes the URL associated with an HTTP request to determine which user-mode worker process/application is to handle the request and route the request to the targeted worker process/application. Thus, for example, one implementation includes a kernel-mode HTTP listener that is selectively configured via a Web admin service (WAS) based a configuration store. The resulting configuration file in the kernel-mode UL process defines a plurality of configuration groups and application pools, etc. The Configuration groups include certain URL's, which have configurable properties applied to them. The configurable properties define which user-mode worker process is to handle HTTP requests. Fore example, application pools can be provided, which identify a worker process or processes that the HTTP requests are routed to. In certain implementations, an HTTP request queuing capability is also provided. The request queue provides time for worker processes/applications to start or get ready.

17 Claims, 6 Drawing Sheets

U.S. PATENT DOCUMENTS

| | | | |
|---|---|---|---|
| 6,188,698 B1 | 2/2001 | Galand et al. | |
| 6,209,018 B1 | 3/2001 | Ben-Shachar et al. | |
| 6,212,573 B1 | 4/2001 | Lim et al. | |
| 6,219,760 B1 | 4/2001 | McMinn | |
| 6,223,202 B1* | 4/2001 | Bayeh | 718/102 |
| 6,223,207 B1 | 4/2001 | Lucovsky et al. | |
| 6,289,458 B1 | 9/2001 | Garg et al. | |
| 6,327,594 B1 | 12/2001 | Van Huben et al. | |
| 6,339,771 B1 | 1/2002 | Zimowski et al. | |
| 6,389,421 B1 | 5/2002 | Hawkins et al. | |
| 6,463,465 B1* | 10/2002 | Nieuwejaar | 709/217 |
| 6,542,920 B1 | 4/2003 | Belkin et al. | |
| 6,574,712 B1 | 6/2003 | Kahle et al. | |
| 6,594,784 B1 | 7/2003 | Harper et al. | |
| 6,604,106 B1 | 8/2003 | Bodin et al. | |
| 6,622,168 B1 | 9/2003 | Datta | |
| 6,629,266 B1 | 9/2003 | Harper et al. | |
| 6,636,900 B2 | 10/2003 | Abdelnur | |
| 6,671,716 B1 | 12/2003 | Diedrichsen et al. | |
| 6,732,138 B1 | 5/2004 | Browning et al. | |
| 6,792,611 B2* | 9/2004 | Honishi et al. | 719/328 |
| 6,810,495 B2 | 10/2004 | Castelli et al. | |
| 6,820,215 B2 | 11/2004 | Harper et al. | |
| 6,915,384 B2 | 7/2005 | Mitra et al. | |
| 6,941,379 B1 | 9/2005 | Dingsor et al. | |
| 6,978,398 B2 | 12/2005 | Harper et al. | |
| 6,990,513 B2* | 1/2006 | Belfiore et al. | 709/203 |
| 7,028,091 B1 | 4/2006 | Tripathi et al. | |
| 7,028,312 B1 | 4/2006 | Merrick et al. | |
| 7,107,329 B1 | 9/2006 | Schroder et al. | |
| 7,257,819 B1 | 8/2007 | Dixon, III et al. | |
| 7,330,483 B1 | 2/2008 | Peters, Jr. et al. | |
| 7,356,803 B2 | 4/2008 | Bau, III et al. | |
| 2001/0010053 A1 | 7/2001 | Ben-Shachar et al. | |
| 2002/0047899 A1 | 4/2002 | Son et al. | |
| 2002/0059425 A1 | 5/2002 | Belfiore et al. | |
| 2002/0062372 A1 | 5/2002 | Hong et al. | |
| 2002/0065900 A1 | 5/2002 | Dor et al. | |
| 2002/0069420 A1 | 6/2002 | Russell et al. | |
| 2002/0073132 A1 | 6/2002 | Van Garderen et al. | |
| 2002/0078174 A1 | 6/2002 | Sim et al. | |
| 2002/0083214 A1 | 6/2002 | Heisig et al. | |
| 2002/0087612 A1 | 7/2002 | Harper et al. | |
| 2002/0087797 A1 | 7/2002 | Adrangi | |
| 2002/0120710 A1 | 8/2002 | Chintalapati et al. | |
| 2002/0129123 A1 | 9/2002 | Johnson et al. | |
| 2002/0147823 A1 | 10/2002 | Healy | |
| 2002/0147966 A1 | 10/2002 | Frazier | |
| 2002/0152328 A1 | 10/2002 | Kagan et al. | |
| 2002/0161908 A1* | 10/2002 | Benitez et al. | 709/231 |
| 2003/0005122 A1 | 1/2003 | Freimuth et al. | |
| 2003/0005181 A1 | 1/2003 | Bau, II et al. | |
| 2003/0023957 A1 | 1/2003 | Bau, II et al. | |
| 2003/0061378 A1 | 3/2003 | Mazzitelli | |
| 2003/0079154 A1 | 4/2003 | Park et al. | |
| 2003/0084018 A1 | 5/2003 | Chintalapati et al. | |
| 2003/0135464 A1 | 7/2003 | Mourad et al. | |
| 2003/0135542 A1 | 7/2003 | Boudreau | |
| 2003/0182400 A1 | 9/2003 | Karagounis et al. | |
| 2004/0068479 A1 | 4/2004 | Wolfson et al. | |
| 2004/0205048 A1 | 10/2004 | Pizzo et al. | |
| 2004/0205769 A1 | 10/2004 | Ruutu | |
| 2005/0021689 A1 | 1/2005 | Marvin et al. | |
| 2005/0235290 A1 | 10/2005 | Jefferson et al. | |
| 2005/0246415 A1* | 11/2005 | Belfiore et al. | 709/203 |
| 2007/0078995 A1 | 4/2007 | Benard et al. | |
| 2007/0199001 A1 | 8/2007 | Grasso | |
| 2007/0204279 A1 | 8/2007 | Warshavsky et al. | |

OTHER PUBLICATIONS

"Web Application: Servlets and Filters" May 16, 2001.*

Li et al., "An Approach for Estimation of Software Aging in a Web Server", 2002, IEEE, Proceedings of the 2002 International Symposium on Empirical Software Engineering, 10 pages.

Mercer et al., "Processor Capacity Reserves: An Abstraction for Managing Processor Usage", Workstation Operating Systems, 1993. Proceedings. Fourth Workshop on Oct. 14-15, 1993, pp. 129-134.

Zhou et al., "Processor Pool-Based Scheduling for Large-Scale NUMA Multiprocessors", Joint International Conference on Measurement and Modeling of Computer Systems, pp. 133-142, Year of Publication: 1991.

Tanenbaum, "Structured Computer Organization", Prentice-Hall Inc, 1984, pp. 1-5.

Alexandrov et al., "Process Management Inside ATLAS DAQ" IEEE, vol. 49, No. 5, The Society of Photo-Optical Instrumentation Engineers, 1997, Oct. 2002, pp. 6.

Canosa, et al., "Extensions to the Mars model for IP Intergrated Services over ATM networks", vol. 3529, Nov. 1998, pp. 12.

Chen et al., "How Agents from Different E-Commerce Enterprises Cooperate", IEEE, 2001, pp. 9.

Donnelly, "Writing IIS Application in Dyalog APL", vol. 33, No. 1, Sep. 2002, pp. 13-17.

Fitzpatrick, "The IRAF Client Display Library", vol. 145, 1998, pp. 200-203.

Hunt et al., "Network Dispatcher:a connection router for scalable Internet services", Elsevier Science, 1998, pp. 12.

Reis et al., "Dynamic Software Process Manager for the Prosoft Software Engineering Environment", pp. 197-202.

Salgarelli et al., "Supporting IP Multicast Intergrated Services in ATM Networks", vol. 3233, pp. 12.

Shim et al., "Mike: Real-Time Microkernel supporting Monitor Concept", pp. 12.

Tanaka et al., "A File Service Mechanism for Distributed Systems", vol. 31, No. 3, Aug., pp. 4.

* cited by examiner

METHODS AND ARRANGEMENTS FOR ROUTING SERVER REQUESTS TO WORKER PROCESSES BASED ON URL

TECHNICAL FIELD

The present invention relates generally to computers and like devices, and more particularly to methods and arrangements for routing server requests to applicable user-mode worker processes based on the requested uniform resource locator (URL).

BACKGROUND

The popularity of the Internet, and in particular, the portion of the Internet known as the World Wide Web, continues to grow. The World Wide Web is basically a collection of computers that are operatively linked together through a plurality of communication networks. Typically, users access the World Wide Web through a personal computer or like device, which is connected to the Internet via a modem of some type. For example, many users of the World Wide Web connect to the Internet using a dial-up telephone networked modem configured to establish data communications through an Internet Services Provider (ISP). Other users connect to the Internet with a faster modem, e.g., a cable modem, digital subscriber line (DSL) modem, etc.

Regardless of how a user ultimately connects to the Internet/World Wide Web, once connected the user typically accesses information available therein by using a web browser or like application. A web browser, such as, for example, Internet Explorer (IE) available from the Microsoft Corp., of Redmond, Wash., is configured to access web pages that are provided through the Internet by other computers. For example, a web server computer may be connected to the Internet and configured with one or more web sites, each having one or more web pages that the user may selectively download and view and possibly interact with. To identify which web site/page the user will typically select a hyper link to the desired web site/page or may choose to manually enter a unique name for the web site/page. The most common name used for identifying a web site/page is known as the uniform resource locator (URL).

One example of a URL is "http://www.microsoft.com". By entering this URL, the user will be connected to an appropriate web server which hosts the Microsoft Corp. web site, and the requested web page will be downloaded, in this case using a hypertext transfer protocol (HTTP), to the web browser. Within the Internet itself, the selected URL will be associated with a specific Internet Protocol (IP) address. This IP address takes the form of a unique numerical identifier, which has been assigned to the targeted web server. Thus, a user may also directly enter an IP address in the web browser. However, the majority of users tend to favor the use of the more easily remembered and entered URL.

When a typical web server receives a request, e.g., an HTTP request, from a web browser, it needs to handle the request. Hence, a web server process may be configured to handle the request itself, or may need to pass the request on to another process, e.g., a worker process, that is configured to handle the request. Conventional web server processes tend to listen to a particular port (e.g., "port 80") provided by a Transmission Control Protocol/Internet Protocol (TCP/IP) kernel-mode provided service. When a request is received, the web server process either handles the request or calls for a worker process to handle the request. To determine which worker process should handle the request, most conventional web server processes either map the request to a physical file or to a dynamic application of some sort, such as a DLL or CGI process. Mapping is typically based on the extension provided at the end of the URL. For example, an "html" extension signifies that the desired web page is in a HyperText Markup Language format. This extension could then be found, for example, in a look-up table, and associated with a specific worker process, if needed. Conversely, the html extension may identify that the web server process can handle the request itself. There exists a plurality of extensions that may be used to identify the applicable worker process.

Once a specific worker process has been identified, the worker process is started (as needed) and the request is forwarded to the worker process. Such decisions and subsequent routing of the request are conducted by user-mode processes. Note that the web server process is a user-mode process too.

Unfortunately, there is usually a delay associated with such user-mode "process hops". For web servers, which often receive thousands of requests each minute, the delays associated with process hops can diminish the efficiency of the web server. In certain configurations, the web server process may be required to share a common communication port with one or more worker processes. This too may further reduce the efficiency of the web server. Moreover, there can be a reduction in the robustness of the web server in certain situations, e.g., when a worker process fails to receive/complete the request, etc.

As such, there is need for improved methods and arrangements in determining which user-mode processes should handle a given request, initiating the appropriate user-mode process, passing the request to the user-mode process, and managing the various requests and user-mode processes.

SUMMARY

The present invention provides improved methods and arrangements for use in determining which user-mode processes should handle a given request, initiating the appropriate user-mode process, passing the request to the user-mode process, and managing the various requests and user-mode processes.

The above stated needs and others are met, for example, by a method in accordance with certain exemplary implementations of the present invention. The method includes causing a kernel-mode process or service in a service device to compare a hierarchical identifier associated with a client device generated request with at least a portion of a configuration file. This comparison identifies, if possible, a most-applicable user-mode process for handling the request within the server device. The method further includes causing the kernel-mode process to provide the request to the identified most applicable user-mode process. In certain further implementations, the method includes causing a user-mode administrative process to generate the configuration file, for example, by providing a configuration store suitable for access by the user-mode administrative process. In certain configurations, the configuration file is accessed via API calls. Here, the configuration store defines one or more logical associations between at least one candidate hierarchical identifier and at least one candidate user-mode process. In certain instances, the configuration store may also include one or more logical rules that are suitable for implementation by the kernel-mode process in identifying the most applicable user-mode process for handling the request within the server device.

In still other implementations, causing the kernel-mode process to provide the request to the identified most applicable user-mode process further includes providing a non-shared interface between the kernel-mode process and the identified most applicable user-mode process. The step of causing the kernel-mode process to provide the request to the identified most applicable user-mode process may also include the step of selectively queuing the request prior to providing the request to the identified most applicable user-mode process.

In certain implementations, the hierarchical identifier may include a uniform resource locator (URL). The most applicable user-mode process may include a user-mode web server processor, or one or more user-mode worker processes. The method may also include the steps of receiving the client device generated request using a kernel-mode communication protocol process, and providing the request to the kernel-mode process. Here, for example, the kernel-mode communication protocol process may provide a kernel-mode TCP/IP service, or other like protocol based service. The method may further include causing the identified most applicable user-mode process to handle the request.

An apparatus is also provided, in accordance with certain exemplary implementations of the present invention. Here, the apparatus includes kernel-mode web server logic that is configured to receive a remotely generated request having a hierarchical identifier suitable for handling by a user-mode process, and selectively identify a most applicable user-mode process for handling the request. The kernel mode logic can include, for example, a universal listener (UL) process or service that is operatively coupled to a kernel-mode TCP/IP or like communication process. The UL process (e.g., a driver) can be further configured to operatively access a configuration file, which specifies one or more logical associations between at least one hierarchical identifier and at least one user-mode process. In certain exemplary implementations, the hierarchical identifier includes a uniform resource locator (URL).

The apparatus may further include user-mode administrative logic that is operatively coupled to the kernel-mode web server logic and configured to selectively alter the configuration file. Here, for example, a configuration store may be provided and made operatively accessible by the user-mode administrative logic. The apparatus may also include user-mode worker logic operatively coupled to the kernel-mode web server logic and configured to provide the user-mode process. By way of example, the kernel-mode web server logic can be operatively configured in a server device or like device.

BRIEF DESCRIPTION OF THE DRAWINGS

A more complete understanding of the various methods an arrangements of the present invention may be had by reference to the following detailed description when taken in conjunction with the accompanying drawings wherein.

DETAILED DESCRIPTION

Turning to the drawings, wherein like reference numerals refer to like elements, the invention is illustrated as being implemented in a suitable computing environment. Although not required, the invention will be described in the general context of computer-executable instructions, such as program modules, being executed by a server computer, which may take the form of a personal computer, a workstation, a dedicated server, a plurality of processors, a mainframe computer, etc. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote memory storage devices.

Figure 1:
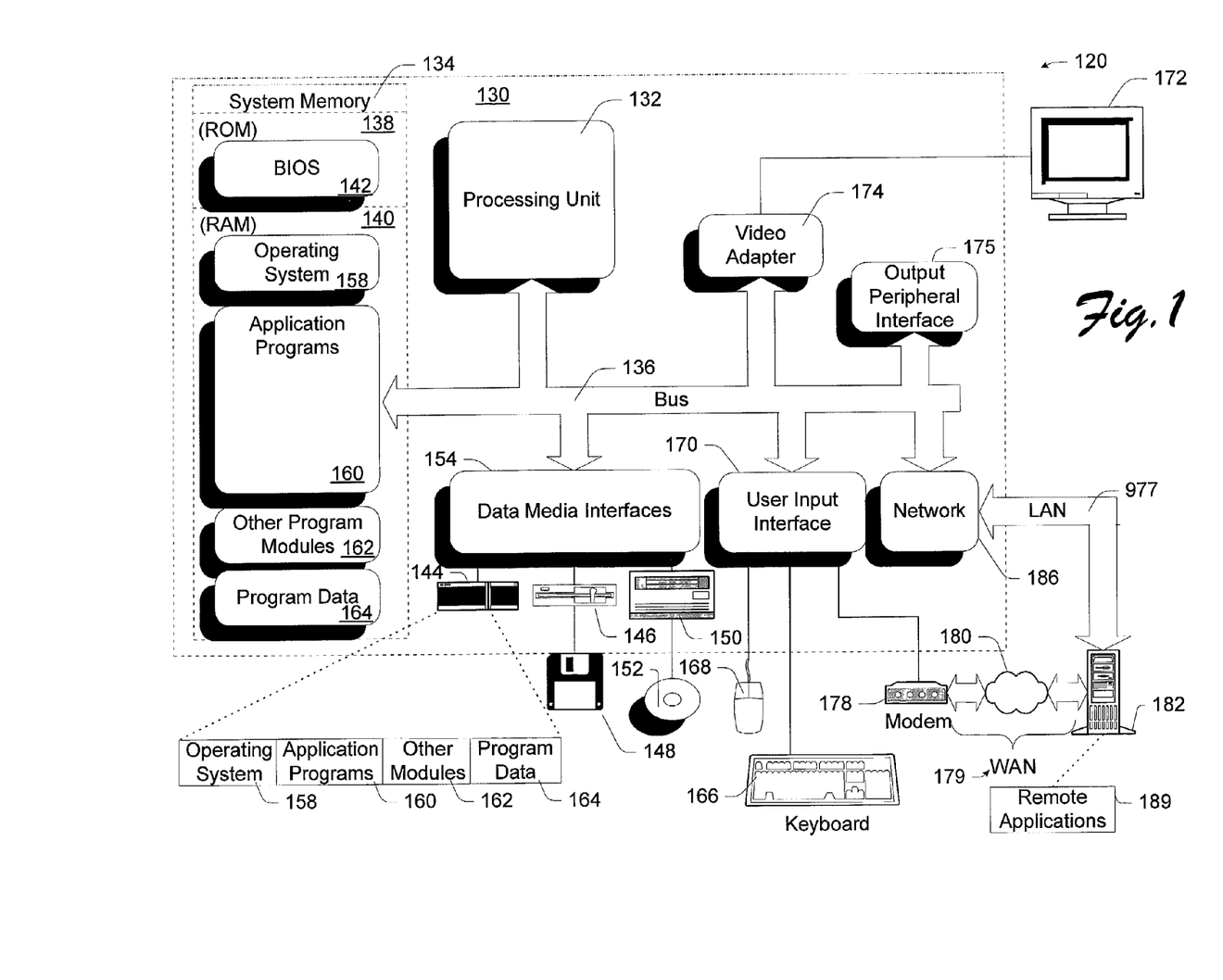
FIG. 1 is a block diagram that depicts an exemplary device, in the form of a computer, which is suitable for use with certain implementations of the present invention.

FIG. 1 illustrates an example of a suitable computing environment 120 on which the subsequently described methods and arrangements may be implemented.

Exemplary computing environment 120 is only one example of a suitable computing environment and is not intended to suggest any limitation as to the scope of use or functionality of the improved methods and arrangements described herein. Neither should computing environment 120 be interpreted as having any dependency or requirement relating to any one or combination of components illustrated in computing environment 120.

The improved methods and arrangements herein are operational with numerous other general purpose or special purpose computing system environments or configurations.

As shown in FIG. 1, computing environment 120 includes a general-purpose computing device in the form of a computer 130. The components of computer 130 may include one or more processors or processing units 132, a system memory 134, and a bus 136 that couples various system components including system memory 134 to processor 132.

Bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 130 typically includes a variety of computer readable media. Such media may be any available media that is accessible by computer 130, and it includes both volatile and non-volatile media, removable and non-removable media.

In FIG. 1, system memory 134 includes computer readable media in the form of volatile memory, such as random access memory (RAM) 140, and/or non-volatile memory, such as read only memory (ROM) 138. A basic input/output system (BIOS) 142, containing the basic routines that help to transfer information between elements within computer 130, such as during start-up, is stored in ROM 138. RAM 140 typically contains data and/or program modules that are immediately accessible to and/or presently being operated on by processor 132.

Computer 130 may further include other removable/non-removable, volatile/non-volatile computer storage media. For example, FIG. 1 illustrates a hard disk drive 144 for reading from and writing to a non-removable, non-volatile magnetic media (not shown and typically called a "hard drive"), a magnetic disk drive 146 for reading from and writing to a removable, non-volatile magnetic disk 148 (e.g., a "floppy disk"), and an optical disk drive 150 for reading from or writing to a removable, non-volatile optical disk 152 such as a CD-ROM, CD-R, CD-RW, DVD-ROM, DVD-RAM or other optical media. Hard disk drive 144, magnetic disk drive 146 and optical disk drive 150 are each connected to bus 136 by one or more interfaces 154.

The drives and associated computer-readable media provide nonvolatile storage of computer readable instructions, data structures, program modules, and other data for computer 130. Although the exemplary environment described herein employs a hard disk, a removable magnetic disk 148 and a removable optical disk 152, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk, magnetic disk 148, optical disk 152, ROM 138, or RAM 140, including, e.g., an operating system 158, one or more application programs 160, other program modules 162, and program data 164.

The improved methods and arrangements described herein may be implemented within operating system 158, one or more application programs 160, other program modules 162, and/or program data 164.

A user may provide commands and information into computer 130 through input devices such as keyboard 166 and pointing device 168 (such as a "mouse"). Other input devices (not shown) may include a microphone, joystick, game pad, satellite dish, serial port, scanner, camera, etc. These and other input devices are connected to the processing unit 132 through a user input interface 170 that is coupled to bus 136, but may be connected by other interface and bus structures, such as a parallel port, game port, or a universal serial bus (USB).

A monitor 172 or other type of display device is also connected to bus 136 via an interface, such as a video adapter 174. In addition to monitor 172, personal computers typically include other peripheral output devices (not shown), such as speakers and printers, which may be connected through output peripheral interface 175.

Computer 130 may operate in a networked environment using logical connections to one or more remote computers, such as a remote computer 182. Remote computer 182 may include many or all of the elements and features described herein relative to computer 130.

Logical connections shown in FIG. 1 are a local area network (LAN) 177 and a general wide area network (WAN) 179. Such networking environments are commonplace in offices, enterprise-wide computer networks, intranets, and the Internet.

When used in a LAN networking environment, computer 130 is connected to LAN 177 via network interface or adapter 186. When used in a WAN networking environment, the computer typically includes a modem 178 or other means for establishing communications over WAN 179. Modem 178, which may be internal or external, may be connected to system bus 136 via the user input interface 170 or other appropriate mechanism.

Depicted in FIG. 1, is a specific implementation of a WAN via the Internet. Here, computer 130 employs modem 178 to establish communications with at least one remote computer 182 via the Internet 180.

In a networked environment, program modules depicted relative to computer 130, or portions thereof, may be stored in a remote memory storage device. Thus, e.g., as depicted in FIG. 1, remote application programs 189 may reside on a memory device of remote computer 182. It will be appreciated that the network connections shown and described are exemplary and other means of establishing a communications link between the computers may be used.

Figure 2:
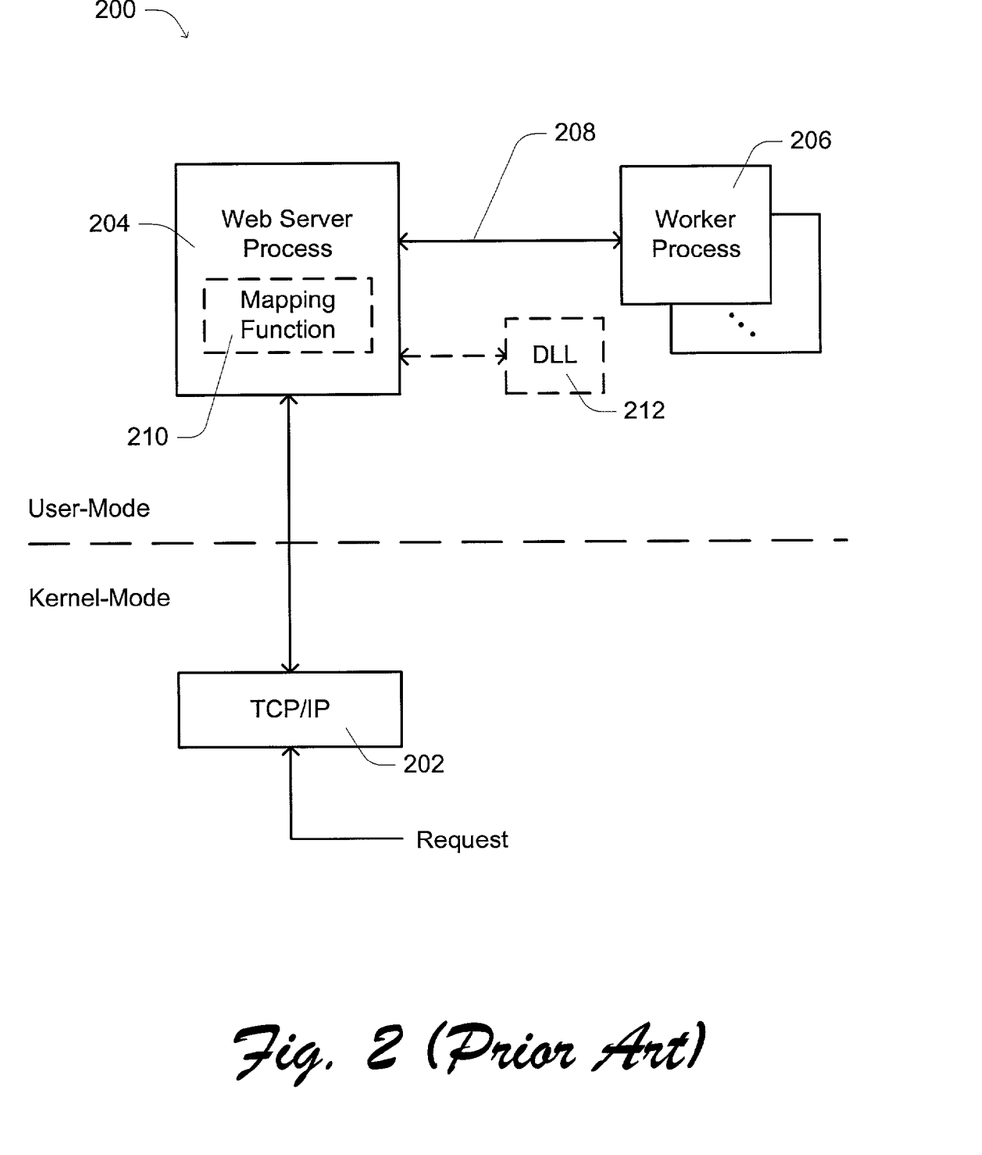
FIG. 2 is a block diagram depicting certain kernel-mode and user-mode processes associated with a conventional web server.

Reference is now made to FIG. 2, which depicts an exemplary conventional web server arrangement 200. Here, requests are received from a client computer, e.g., over a network and applicable interfaces (not shown), by a kernel-mode TCP/IP service 202. TCP/IP service 202 provides the request to a user-mode web server process 204 through a port. By way of example, web server process 204 may be an IIS web server process as developed by Microsoft Corp. As illustrated, web server process 204, when needed, can initiate a process hop to one or more user-mode worker processes 206, as represented by line 208. Worker processes 206 may take the form of any of a variety of functions, and/or applications, which are configured to handle or otherwise support certain types of requests. As described in the previous Background Section, to determine which of worker process 206 needs to handle a given request, web server process 204 can access a mapping function 210 (e.g., a table, list, etc.) and identify an appropriate worker process based on the extension-identifying portion of the URL in the request. Alternatively, web server 204 may require the assistance of a DLL 212 in making such a decision. Here, for example DLL 212 or a like capability would identify the appropriate worker process based on the extension-identifying portion of the URL in the request.

Figure 3:
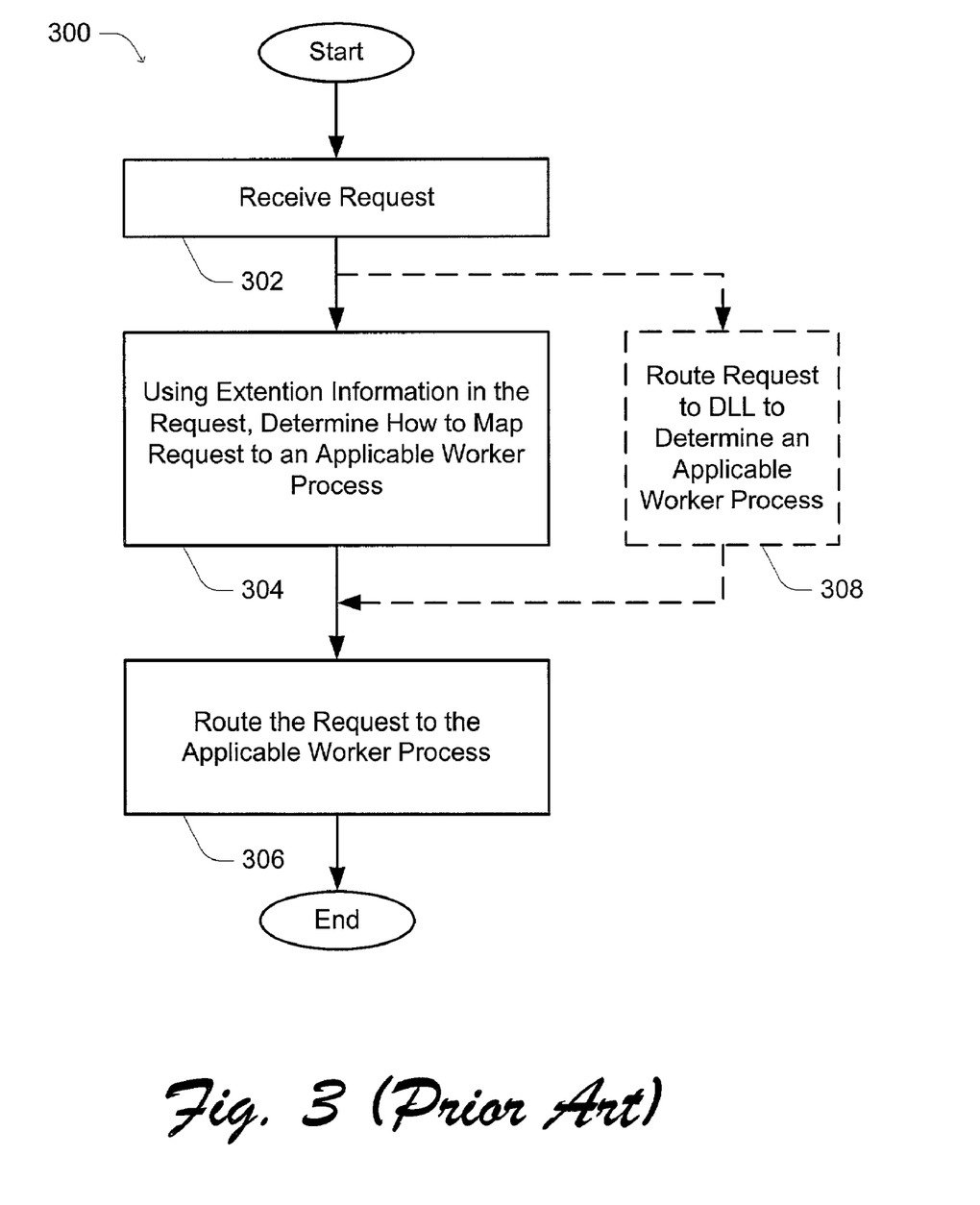
FIG. 3 is a flow chart depicting a conventional method for handling requests using the web server in FIG. 2.

FIG. 3 presents a flow chart depicting an exemplary conventional method 300 for handling requests received by web server arrangement 200. In step 302, the request is received by TCP/IP service 202 and passed on to web server process 204. Next, in step 304, web server 204 determines if there is a need to invoke a worker process 206. Again this is typically determined based on the extension-identifying portion of the URL. The extension-identifying portion of the URL essentially identifies the type of data associated with the defined URL, and consequently may be used to redirect or route the request to an applicable user-mode process. The next step, 306, is to pass or route the request to the applicable user-mode process for further handling.

As shown, in certain configurations, step 304 can be replaced or otherwise supported/enhanced by step 308, which in this example routes the request to DLL 212 or other like user-mode process to help determine which user-mode worker process 206 would be appropriate to handle the request. As in step 304, step 308 would also likely use the extension-identifying portion of the URL to help make such decisions.

As mentioned earlier, there are several drawbacks to web server arrangement 200 and associated method 300. One of the major drawbacks is the inherent delay associated with each user-mode process hop (e.g., cross-process context switch). Another is the need to multiplex or otherwise share the use of one or more communication ports between user-mode processes. Yet another is often the lack of management over the worker processes, especially, for example, should one fail during the processing of a request.

Figure 4:
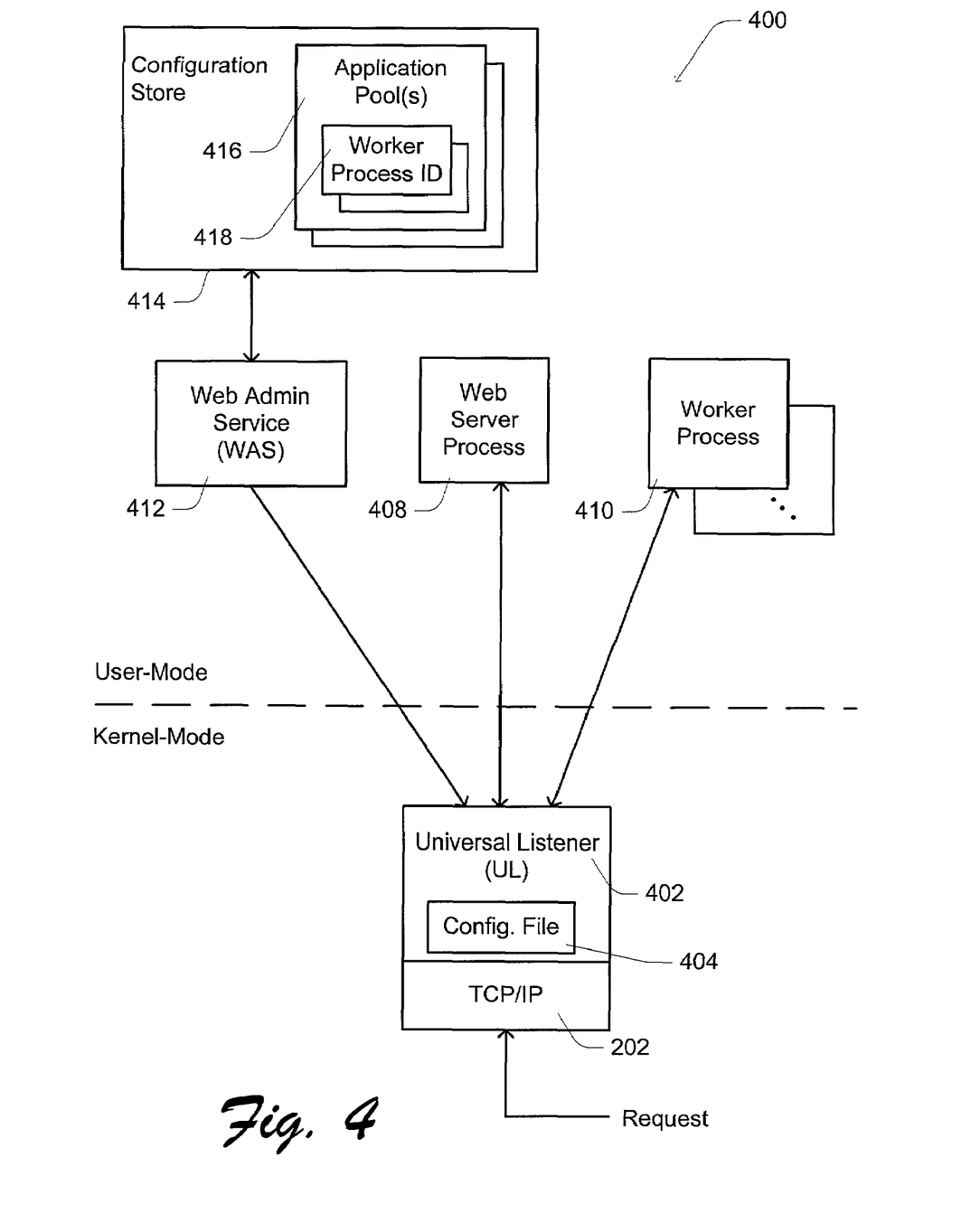
FIG. 4 is a block diagram depicting certain kernel-mode and user-mode processes, including a kernel-mode universal listener (UL) process, associated with an improved web server in accordance with certain exemplary implementations of the present invention.

With these and other potential problems in mind, an improved web server arrangement 400 is depicted in FIG. 4, in accordance with certain exemplary implementations of the present invention.

Improved web server arrangement 400 includes a kernel-mode universal listener (UL) service 402, which is provided on top of TCP/IP service 202. UL service 402 includes or otherwise is configured to access a configuration file 404. For purposes of simplicity, in this example configuration file 404 is illustrated as being logically within the representative block of UL service 402.

In certain exemplary implementations, UL service 402 includes a cache that is checked before routing the request to a worker process. If a valid response is found in the cache, UL service 402 returns the valid response instead of passing the request on to the process.

Configuration file 404 is configured to support a decision process that determines which, if any, user-mode process should handle a request as received via TCP/IP service 202. Rather than examining the extension-identifying portion of the URL in the received request to make such a determination, UL service 402 and configuration file 404 are configured to examine the hierarchical formatted information in the URL. The resulting decision will then cause UL service 402 to either deny the request or provide the request to a most-appropriate user-mode process. In certain implementations, UL service 402 stores the configuration information as a tree of URL's in memory, rather than as a file.

For example, as shown, UL service 402 may pass the request to a web server process 408 for further handling, or to a worker process 410 for further handling. Doing so essentially eliminates user-mode process hops and associated processing delays. Further, in accordance with certain implementations of the present invention, each of the user-mode processes can be supported by a private (non-shared) interface with kernel-mode UL service 402. Additionally, UL service 402 may be advantageously configured to provide improved management over such interfaces and/or the various user-mode processes.

It should be noted that the web server process can be considered to be one type of worker process.

In accordance with certain implementations of the present invention, configuration file 404 is updated or otherwise managed via a user-mode Web Administration Service (WAS) process 412. As depicted, WAS process 412 is operatively associated with a configuration store 414. Configuration store 414 provides the necessary information about the structure/configuration of web server arrangement 400 to allow for certain associations to be made between at least a portion of the available web accessible sites/pages/services provided therein and the supporting user-mode processes. For example, configuration store 414 may define a plurality of application pools 416, each having associated with it one or more user-mode process identifiers 418. Hence, there may be a user-mode process identifier 418 that identifies web server process 408, or a worker process 410.

WAS process 412 maintains configuration file 404 using the associated information in configuration store 414. Thus, for example, as illustratively depicted in FIG. 5, configuration file 404 may include a listing or similar tree-like arrangement that can be quickly examined upon receiving a request based on the hierarchical portion of the URL. In this illustrative example, a plurality of data are associated together in configuration groups such that UL service 402 can begin to systematically "walk through" the hierarchical portion of the requested URL to find the best matching configuration group and once found identify the most-appropriate application pool.

Figure 5:
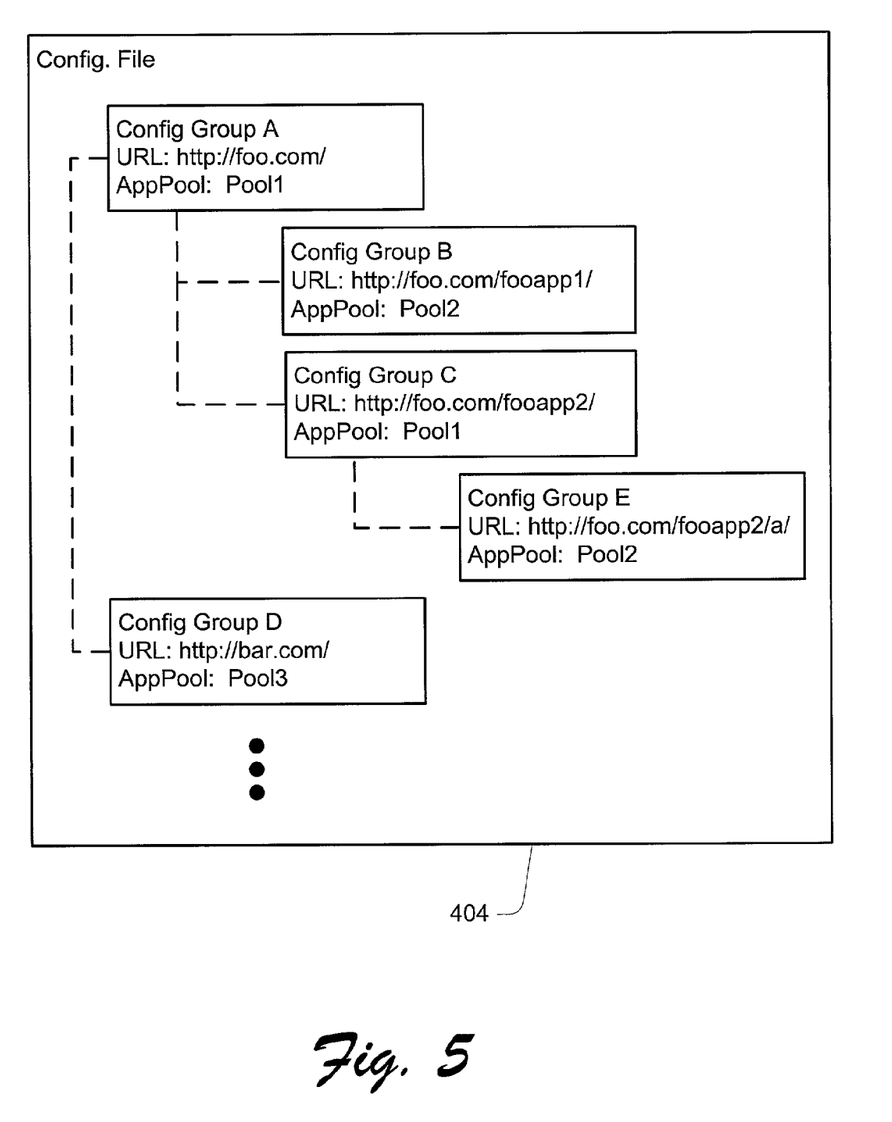
FIG. 5 is a diagram illustratively depicting a hierarchical structure of a configuration file associated with a kernel-mode universal listener (UL) process, for example, as in FIG. 4, in accordance with certain exemplary implementations of the present invention.

For example, let us assume that the requested URL was "http://foo.com/". Upon receiving the request, UL process 402 would examine configuration file 404 for a best matching configuration group. Here, as depicted in FIG. 5, the first configuration group, "Config. Group A" is associated with the entire requested URL, namely, "http://foo.com/". Thus, according to this association, a user-mode process selected from application pool "Pool 1" should handle the request.

Next, let us assume that the requested URL was "http://foo.com/fooapp2/". Here, as depicted, configuration group, "Config. Group C" is associated with the entire requested URL, namely, "http://foo.com/fooapp2/". Thus, according to this association, a user-mode process selected from application pool "Pool 1" should handle the request.

Similarly, for a requested URL of "http://foo.com/fooapp2/a/", configuration group, "Config. Group E" is associated with the entire requested URL, namely, "http://foo.com/fooapp2/a/". Thus, according to this association, a user-mode process selected from application pool "Pool 2" should handle the request.

In another example, let us assume that the requested URL was "http://foo.com/fooapp4/". Here, the best matching configuration group in configuration file 404 as depicted in FIG. 5, is configuration group, "Config. Group A", which at least matches the initial "http://foo.com/" portion of the requested URL. Thus, since there are not better matches, according to this association, a user-mode process selected from application pool "Pool 1" should handle the request.

If the requested URL were, for example, "http://microsoft.com/", then there would be no best matching configuration group in configuration file 404 as depicted in FIG. 5. Thus, the request would be rejected or otherwise handled/dropped on the kernel-mode side by UL service 402.

Those skilled in the art will recognize that configuration store 414, and configuration file 404, and/or sub-portions thereof may be arranged/configured using a variety of different data handling/processing techniques. The tree-like structure of configuration file 404 is therefore just used to illustrate one exemplary type data associated technique. Preferably, the selected technique will support quick searching in order to find the best matching configuration group, etc., based on the requested URL.

In accordance with certain further implementations of the present invention, configuration file 404 may also provide guidance or define logical rules with regard to the selection of a user-mode process in a given application pool 416. Thus, for example, a possible rule may prioritize the use of user-mode processes according to some scheme. One such exemplary scheme may cause UL service 402 to look for already running user-mode processes, rather than start a new user-mode process. Rules may also be provided to better manage the private interfaces and the running/halting/closing of user-mode processes.

Returning to FIG. 4, in accordance with certain exemplary implementations of the present invention WAS process 412 is configured to provide user administration capabilities in configuring, maintaining, or otherwise modifying all or part of configuration store 414. Thus, for example, a web server administrator may add/delete data, or otherwise modify existing data in configuration store 414, as needed. In certain configurations, the administrator may be able to define one or more rules or parameters that operatively affect the operation of UL service 402. In other exemplary implementations, one or more automated or semi-automated user-mode processes/applications may be used to gather and/or otherwise provide data for use in configuration store 414.

Figure 6:
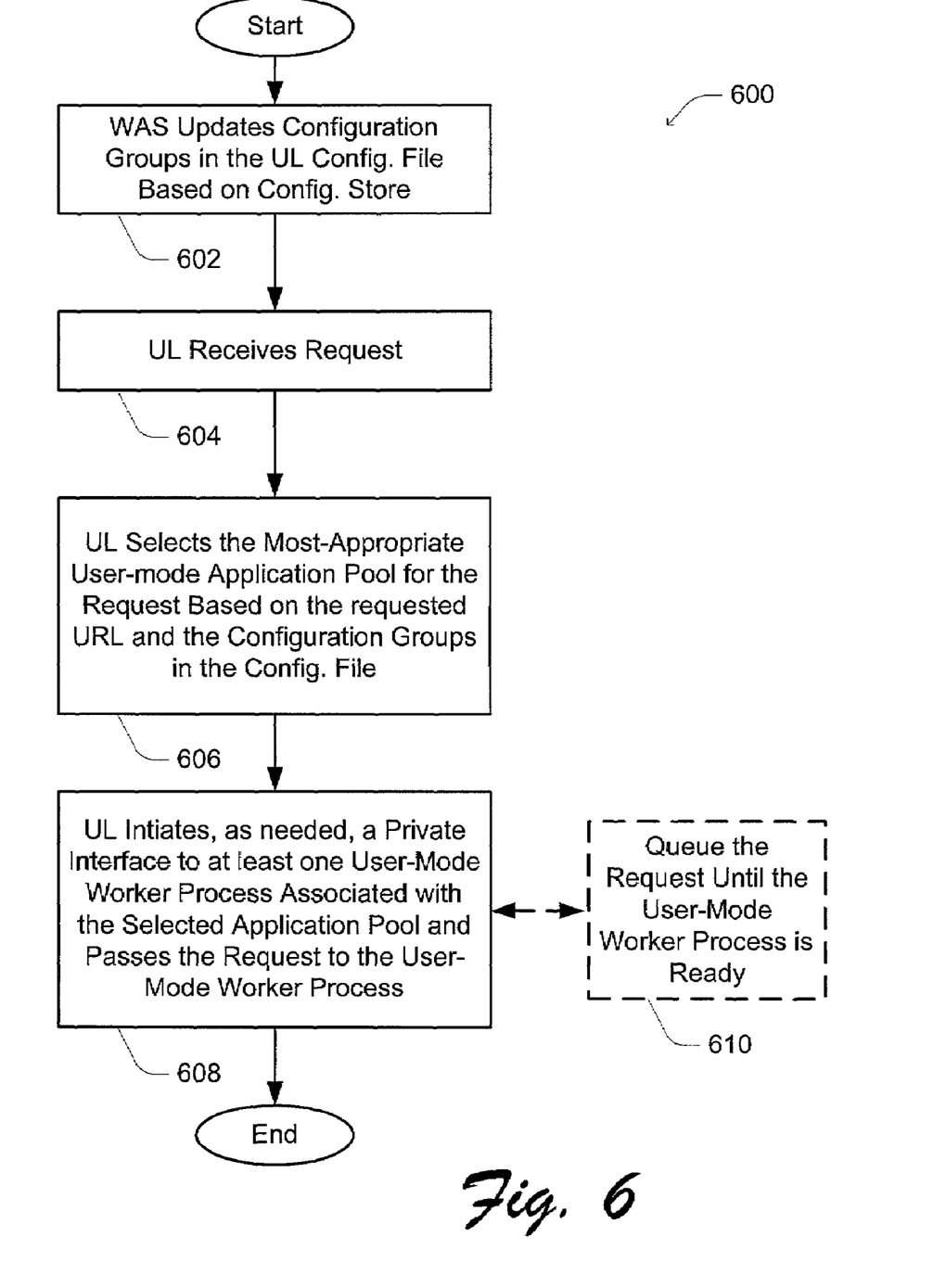
FIG. 6 is a flow chart depicting a method for handling requests using an improved web server, for example, as in FIG. 3, in accordance with certain exemplary implementations f the present invention.

Reference is now made to FIG. 6, which is a flow chart depicting an improved process 600 for use in handling requests in a web server arrangement. In step 602, WAS process 412 updates or otherwise establishes/maintains the configuration group(s) in configuration file 404 associated with kernel-mode UL service 402, based on information in configuration store 414. Next, in step 604, a request is received from a client device by UL process 402, e.g., via TCP/IP service 202 and interconnecting network services/arrangements. The request includes a URL.

In step 606, UL service 402 examines the URL in the received request and searches or in some other manner attempts to identify a most appropriate user-mode application pool 416 associated with a best matching configuration group. For example, the best matching configuration group might be the configuration group defined in configuration file 404 that best matches the URL. If a cache is included in UL service 402, then the cache can be checked before routing the request to a worker process, as previously described.

Next, in step 608, the most appropriate user-mode process identified in the application pool is started (if needed) and/or otherwise communicated with by UL service 402 and provided with the request for further handling. In certain instances, there may be a need to have the request handled by more than one user-mode process.

In accordance with certain further implementations of the present invention, method 600 may further include step 610. In step 610, UL service 402 is further configured to maintain a queuing mechanism or process that holds requests, as needed, until such time as the selected user mode process is ready to handle the request. Thus, for example, there may be a need to buffer the request while a new user-mode process is loaded. There may also be a need to buffer a request until the requisite processing/communication resources become available to handle the request and/or user-mode process.

Thus, although some preferred embodiments of the various methods and arrangements of the present invention have been illustrated in the accompanying Drawings and described in the foregoing Detailed Description, it will be understood that the invention is not limited to the exemplary embodiments disclosed, but is capable of numerous rearrangements, modifications and substitutions without departing from the spirit of the invention as set forth and defined by the following claims.

What is claimed is:

1. A method comprising:
receiving, using a kernel mode process, a request from a sending device, the request comprising a hierarchical identifier, wherein the request comprises a uniform resource locator (URL) that includes the hierarchical identifier;
generating, using the kernel mode process, a configuration file that includes a hierarchical tree-like arrangement of uniform resource locators (URLs) having a plurality of directories and one or more subdirectories associated with each of the plurality of directories, the configuration file including a user-mode processes associated with each of the URLs and containing elements stored as a tree-like arrangement;
identifying, using the kernel mode process, the directory and the associated subdirectory in the hierarchical tree-like arrangement corresponding to the hierarchical identifier to identify an appropriate user-mode process of a server device for handling the request, wherein identifying the directory and the associated subdirectory corresponding to the hierarchical identifier comprises walking through directories and subdirectories in the tree-like arrangement of URLs in the configuration file to find best match to the hierarchical identifier or to reject the request if there is not a match; and
providing the request to the identified appropriate user-mode process of the server device that handles the request by providing a response for transmission to the sending device.

2. The method as recited in claim 1, further comprising:
generating a configuration store via a user-mode administrative process that includes data configured to indicate a rule defined by an administrator; and
updating the configuration file based on the data included in the configuration store.

3. The method as recited in claim 2, wherein generating the configuration file comprises:
defining one or more logical associations between at least one candidate hierarchical identifier and at least one candidate user-mode process; and
maintaining the one or more logical associations in the configuration store.

4. The method as recited in claim 1, wherein the URL is hierarchical formatted; and wherein the method further comprises analyzing the hierarchical formatted URL to locate one of the plurality of directories and subdirectories in the configuration file to identify the process in the server that will handle the request.

5. The method as recited in claim 1, wherein the appropriate user-mode process includes a user-mode web server process.

6. The method as recited in claim 1, further comprising:
receiving the request using a kernel-mode communication protocol process; and
providing the request to a kernel-mode process.

7. The method as recited in claim 6, wherein the kernel-mode communication protocol process comprises a kernel-mode TCP/IP process.

8. The method as recited in claim 1 wherein the configuration file comprises hierarchical identifiers and corresponding user-mode process indicators, and wherein the user-mode process indicators indicate user-mode processes that handle the request.

9. A method comprising:
receiving a request from a client device using a kernel-mode process, the request comprising a hierarchical identifier generated by a client device, wherein the request comprises a uniform resource locator (URL) that includes the hierarchical identifier;
generating in the kernel-mode process a configuration file that includes a hierarchical tree-like arrangement of uniform resource locators (URLs) having a plurality of directories and one or more subdirectories associated with each of the plurality of directories, wherein the configuration file contains elements stored as a tree-like arrangement, the configuration file identifying a user-mode processes associated with each URL;
identifying, using the kernel-mode process, the directory and the associated subdirectory corresponding to the hierarchical identifier to identify an appropriate user-mode process of a server device for handling the request, wherein identifying the directory and the associated subdirectory corresponding to the hierarchical identifier comprises walking through directories and subdirectories in the tree-like arrangement of URLs in the configuration file to find best match to the hierarchical identifier or to reject the request if there is not a match;

providing the request to the identified appropriate user-mode process of the server device that handles the request; and providing, using the identified appropriate user-mode process, a response to the request for transmission to the sending device.

10. The method as recited in claim 9 wherein finding the best match includes locating an identifier in the directory or subdirectory that has the most number of characters that match characters in the hierarchical identifier.

11. A computer-readable medium having computer-executable instructions for performing steps comprising:

causing a request generated by a client device to be received in a server device using a kernel-mode process, the request comprising a hierarchical identifier associated with a client device and a uniform resource locator (URL) that includes the hierarchical identifier;

causing the kernel-mode process to compare the hierarchical identifier with at least a portion of a configuration file to identify a most applicable user-mode process for handling the client device generated request within the server device, wherein the configuration file contains elements stored as a tree-like arrangement;

causing the kernel-mode process to identify the directory and the associated subdirectory corresponding to the hierarchical identifier to identify an appropriate user-mode process of a server device for handling the request, wherein identifying the directory and the associated subdirectory corresponding to the hierarchical identifier comprises walking through directories and subdirectories in the tree-like arrangement of URLs in the configuration file to find best match to the hierarchical identifier or to reject the request if there is not a match; and causing the kernel-mode process to provide the client device generated request to the identified most applicable user-mode process that will provide a response to the request for the client device.

12. The computer-readable medium as recited in claim 11, having further computer-executable instructions for performing steps comprising:

causing a user-mode administrative process to generate the configuration file by copying data in a configuration store to the configuration file.

13. The computer-readable medium as recited in claim 12, wherein causing the user-mode administrative process to generate the configuration file, wherein the configuration store is suitable for access by the user-mode administrative process, wherein the configuration store defines one or more logical associations between at least one candidate hierarchical identifier and at least one candidate user-mode process.

14. The computer-readable medium as recited in claim 13, wherein the configuration store further includes one or more logical rules suitable for use by the kernel-mode process in identifying the most applicable user-mode process for handling the client device generated request within the server device.

15. The computer-readable medium as recited in claim 11, wherein causing the kernel-mode process to provide the client device generated request to the identified most applicable user-mode process further includes:

providing a non-shared interface between the kernel-mode process and the identified most applicable user-mode process, such that the client device generated request can be provided to the identified most applicable user-mode process via the non-shared interface.

16. The computer-readable medium as recited in claim 11, wherein causing the kernel-mode process to provide the client device generated request to the identified most applicable user-mode process further includes:

selectively queuing the client device generated request prior to providing the request to the identified most applicable user-mode process.

17. The computer-readable medium as recited in claim 11, wherein the most applicable user-mode process includes a user-mode web server process.

* * * * *

UNITED STATES PATENT AND TRADEMARK OFFICE
CERTIFICATE OF CORRECTION

PATENT NO.       : 7,430,738 B1
APPLICATION NO.  : 09/878950
DATED            : September 30, 2008
INVENTOR(S)      : Henry L. Sanders et al.

It is certified that error appears in the above-identified patent and that said Letters Patent is hereby corrected as shown below:

In column 2, line 4, delete ""html"" and insert -- ".html" --, therefor.

In column 2, line 8, delete "html" and insert -- .html --, therefor.

In column 2, line 45, delete "service" and insert -- server --, therefor. (2nd occurrence)

Signed and Sealed this
Twenty-sixth Day of April, 2011

David J. Kappos
*Director of the United States Patent and Trademark Office*